United States Patent [19]
Dance

[11] 3,767,166
[45] Oct. 23, 1973

[54] TUBULAR VALVE OR OTHER HOUSING HAVING AN OUTWARDLY-EXTENDING FLANGE ENGAGEABLE BY AN INWARDLY-FLANGED, INTERNALLY SCREW-THREADED CONNECTING RING

[75] Inventor: Arthur Dance, Bedworth, England

[73] Assignee: Townson & Coxsan Limited, Bedworth, England

[22] Filed: June 13, 1972

[21] Appl. No.: 262,311

[30] Foreign Application Priority Data
June 29, 1971 Great Britain.................. 30,328/71

[52] U.S. Cl. ............................................ 251/366
[51] Int. Cl............................................ F16k 27/00
[58] Field of Search................... 251/366, 367, 315

[56] References Cited
UNITED STATES PATENTS

| | | | |
|---|---|---|---|
| 3,096,965 | 7/1963 | Margus et al.................. | 251/315 X |
| 3,245,655 | 4/1966 | Oetjens............................ | 251/315 |
| 3,635,439 | 1/1972 | McNally........................... | 251/315 |
| 2,995,336 | 8/1961 | Usab................................. | 251/315 X |
| 3,284,045 | 11/1966 | Kulisek.............................. | 251/315 |
| 3,550,902 | 12/1970 | Pidgeon et al.................. | 251/315 X |

*Primary Examiner*—Samuel Scott
*Attorney*—John A. Mawhinney

[57] ABSTRACT

A tubular valve housing having a tubular end portion terminating in an outwardly-extending flange carrying an internally screw-threaded connecting ring having an internal annular shoulder at the inner end of the screw-thread and arranged to abut the flange at the inboard end thereof and to be retained by the flange from movement axially outwardly of the tubular end portion. The flange is of full circular shape because the tubular end portion is integral with the remainder of the housing and the lateral dimensions of the remainder of the housing are less than the internal diameter of the connecting ring to permit the connecting ring to be passed axially along the outside of at least the end portion of the housing until the shoulder on the ring has engaged the back of the flange.

1 Claim, 4 Drawing Figures

TUBULAR VALVE OR OTHER HOUSING HAVING AN OUTWARDLY-EXTENDING FLANGE ENGAGEABLE BY AN INWARDLY-FLANGED, INTERNALLY SCREW-THREADED CONNECTING RING

The invention relates to a tubular valve or other housing having an outwardly-extending flange engageable by an inwardly-flanged, internally screw-threaded connecting ring and is particularly, but not exclusively concerned with an isolating valve to be connected to a pump.

A known isolating valve having a housing of this kind has the outwardly-extending flange at one end of the housing and a lateral extension intermediate the ends of the housing extending beyond the periphery of the flange and containing the valve member of the isolating valve. Furthermore such a known isolating valve usually has an internally screw-threaded socket at the other end thereof having external dimensions greater than the diameter of the flange. In a valve having either of these features, it is not possible to pass the internally-flanged, internally scrwew-threaded connecting ring along the housing from said other end to enable the flange of the ring to be engaged behind the flange on said one end of the housing. Therefore in the known isolating valve housing, the flange on said one end is formed with a pair of diametrically-opposite flat edges or is made elliptical to enable the ring to be tipped relatively to the longitudinal axis of the flange on said one end and passed over the flat edges or the shorter diameter of the ellipse from said one end of the housing and then to be tipped back into a plane perpendicular to the longitudinal axis of the flange on said one end, whereby the portions of said flange of full diameter will be engaged by the flange on the ring. This arrangement, however, suffers from the disadvantage that only the portions of the flange on said one end of the housing of full diameter can be used to effect a seal, usually by compressing a gasket, with an externally-threaded pipe-end or spigot on to which the ring is screwed. An object of the invention is to provide a housing in which this disadvantage is overcome.

According to the invention, a tubular valve or other housing has at one end thereof a tubular end portion integral with the remainder of the housing and terminating in an outwardly-extending circular flange having an external periphery of full circular shape and an internally scrwe-threaded connecting ring mounted on said tubular end portion by axial movement of the ring, along the tubular end portion from the inboard end thereof towards the flange and having an internal annular shoulder at the inner end of the screw-thread and abutting the flange at the inboard end thereof and retained by the flange from movement axially outwardly of the tubular end portion, the lateral dimensions of the remainder of the housing being such that no other part of the housing extends laterally from the longitudinal axis of the flange beyond the internal periphery of the connecting ring, thereby to permit the connecting ring to be passed axially along the outside of the housing from the end thereof remote from the flange until the shoulder on the ring has engaged the back of the flange.

With the housing as set out in the immediately preceding paragraph, the full circular front face of the flange is used for effecting a seal against the end face of an abutting screw-threaded pipe-end or spigot on to which the connecting ring, is threaded. Such a seal is usually effected by compressing a gasket between the flange and the pipe-end or spigot, and therefore the gasket is compressed by the full area of the flange.

By way of example, an embodiment of a housing for an isolating valve for a pump in accordance with the invention is now described with reference to the accompanying drawings, in which.

Figure 1:
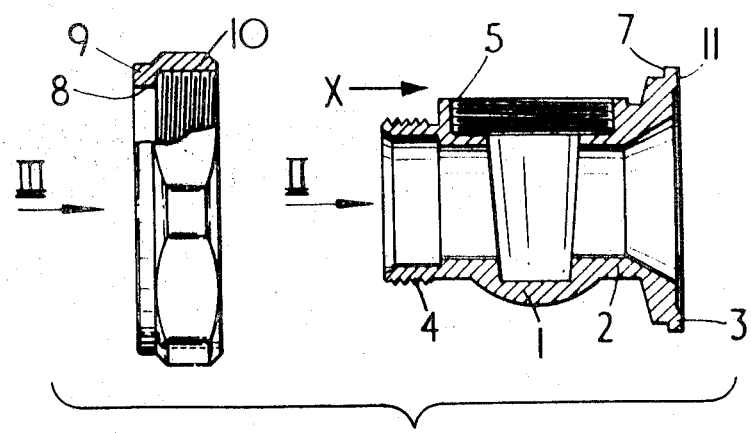
FIG. 1 is an axial section through the embodiment of the housing and showing the connecting ring in part axial section and part elevation separated from the body of the housing.
Figure 2:
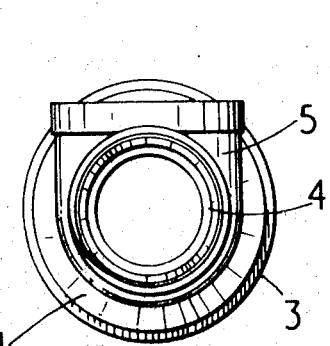
FIG. 2 is an end view of the body of the housing in the direction of the arrow II in FIG. 1.
Figure 3:
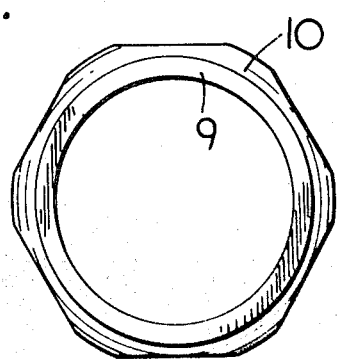
FIG. 3 is an end view of the ring only in the direction of arrow III in FIG. 1.
Figure 4:
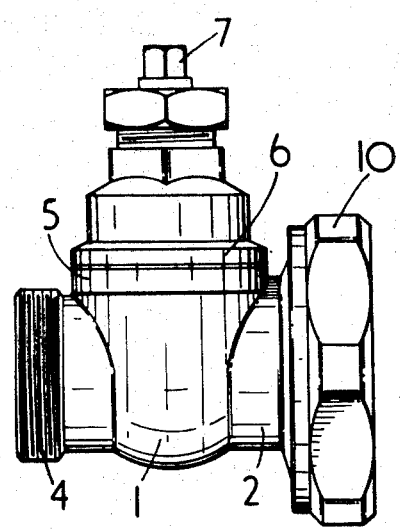
FIG. 4 is a side view of an assembled valve including the housing shown in FIG. 1.

Referring to FIGS. 1 to 4, the housing comprises a body 1 having at one end thereof a tubular end portion 2 provided with an outwardly extending flange 3 at the outer end of the tubular end portion 2. The other end of the body 1 is formed with an externally-screw-threaded spigot 4. The spigot 4 could alternatively be an internally screw-threaded socket. Intermediate between the ends there is a screw-threaded socket 5 for receiving tubular boss 6 (shown in FIG. 4) supporting a valve member of which an operating spindle is shown at 12. The inner end face 7 of the flange 3 is, when the housing is to be connected to an externally screw-threaded pipe-end or spigot (not shown), engaged by an end face 8 of an inwardly-extending shoulder 9 on an internally screw-threaded connecting ring 10. The latter is screwed on to the pipe-end or spigot, a gasket being compressed between the outer end face 11 of the flange 3 and the adjacent end face of the pipe-end or spigot.

The internal diameter of the inner end face 7 of the flange 3 is greater than the lateral extremity of the socket 5 and greater than the external diameter of the spigot 4, or the socket which could be provided instead of the spigot 4. Thus no part of the body 1 of the housing projects from the longitudinal centre-line thereof as far as the flange 3 and as far as does the inner periphery of the connecting ring 10 when the latter has been located against the face 7 of the flange. This enables the connecting ring 10 to be freely passed in the direction of arrow X in FIG. 1 along the whole length of the body 1 of the housing until the face 8 of the flange 9 of the ring 10 has engaged the face 7 of the flange 3. The flange 3 can therefore be of full annular shape and does not have to be provided with diametrically-opposite flat edges or to be elliptical to enable the connecting ring 10 to be placed in position from the flanged end of the body of the housing, as in the aforesaid known valve housing. As the flange 3 is of full annular shape the sealing area of the flange extends around the whole circumference thereof and not partially therearound, as in the aforesaid known valve housing.

What I claim as my invention and desire to secure by Letters Patent of the United States is:

1. A tubular valve or other housing having at one end thereof a tubular end portion integral with the remainder of the housing and terminating in an outwardly-extending circular flange having an external periphery of full circular shape and an internally screw-threaded connecting ring mounted on said tubular end portion by axial movement of the ring along the tubular end portion from the inboard end thereof towards the flange and having an internal annular shoulder at the inner end of the screw-thread and abutting the flange at the inboard end thereof and retained by the flange from movement axially outwardly of the tubular end portion, the lateral dimensions of the remainder of the housing being such that no other part of the housing extends laterally from the longitudinal axis of the flange beyond the internal periphery of the connecting ring, thereby to permit the connecting ring to be passed axially along the outside of the housing from the end thereof remote from the flange until the shoulder on the ring has engaged the back of the flange.

* * * * *